United States Patent
Hasegawa et al.

(10) Patent No.: US 7,843,179 B2
(45) Date of Patent: Nov. 30, 2010

(54) CONTROL CIRCUIT FOR SYNCHRONOUS RECTIFIER-TYPE DC-DC CONVERTER, SYNCHRONOUS RECTIFIER-TYPE DC-DC CONVERTER AND CONTROL METHOD THEREOF

(75) Inventors: Morihito Hasegawa, Kasugai (JP); Takashi Matsumoto, Kasugai (JP); Ryuta Nagai, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 473 days.

(21) Appl. No.: 11/937,818

(22) Filed: Nov. 9, 2007

(65) Prior Publication Data
US 2008/0111531 A1 May 15, 2008

(30) Foreign Application Priority Data
Nov. 10, 2006 (JP) .............................. 2006-305621

(51) Int. Cl.
*G05F 1/59* (2006.01)
(52) U.S. Cl. .................. 323/271; 323/283; 323/285
(58) Field of Classification Search .................. 323/271, 323/282, 283, 284, 285
See application file for complete search history.

(56) References Cited

U.S. PATENT DOCUMENTS

| | | | |
|---|---|---|---|
| 7,019,507 B1 * | 3/2006 | Dittmer et al. ............... | 323/284 |
| 7,492,135 B2 * | 2/2009 | Saeki et al. .................. | 323/271 |
| 7,538,526 B2 * | 5/2009 | Kojima et al. ................ | 323/225 |
| 7,652,945 B2 * | 1/2010 | Chu et al. ..................... | 365/226 |
| 7,667,445 B2 * | 2/2010 | Hiasa .......................... | 323/284 |

FOREIGN PATENT DOCUMENTS

JP 08-289535 11/2006

* cited by examiner

*Primary Examiner*—Jeffrey L Sterrett
(74) *Attorney, Agent, or Firm*—Arent Fox LLP (57) ABSTRACT

To provide a control circuit for a synchronous rectifier-type DC-DC converter, a synchronous rectifier-type DC-DC converter and a control method thereof in which, in a light load state and a no-load state, an output voltage can be dropped to thus prevent an overshoot state from continuing. A synchronous rectifier-type DC-DC converter 10 and a control circuit 20A thereof comprising a first switching element FET1 that is made conductive when power is accumulated in an induction element L1, and a second switching element FET2 that is made conductive when power accumulated in induction element L1 is supplied to a load, also comprises a detecting unit COMP2 that detects that a value of an output voltage VOUT of the synchronous rectifier-type DC-DC converter 10A is a predetermined voltage value that is higher than a target voltage value, and control units COMP1 and OR1 that maintain the second switching element FET2 in a conductive state after discharge of the power accumulated in the induction element L1 is finished, based on the detection results of the detecting unit COMP2.

21 Claims, 4 Drawing Sheets

CIRCUIT CONFIGURATION DIAGRAM OF STEP-DOWN DC-DC CONVERTER
ACCORDING TO FIRST EMBODIMENT

FIG. 1  CIRCUIT CONFIGURATION DIAGRAM OF STEP-DOWN DC-DC CONVERTER ACCORDING TO FIRST EMBODIMENT

FIG. 3 CIRCUIT CONFIGURATION DIAGRAM OF STEP-DOWN DC-DC CONVERTER ACCORDING TO SECOND EMBODIMENT

FIG. 4 (PRIOR ART) CIRCUIT CONFIGURATION DIAGRAM OF CONVENTIONAL SYNCHRONOUS RECTIFIER-TYPE DC-DC CONVERTER

CONTROL CIRCUIT FOR SYNCHRONOUS RECTIFIER-TYPE DC-DC CONVERTER, SYNCHRONOUS RECTIFIER-TYPE DC-DC CONVERTER AND CONTROL METHOD THEREOF

CROSS-REFERENCE TO RELATED APPLICATIONS

This application is based upon and claims the benefit of priority from the prior Japanese Patent Application No. 2006-305621 filed on Nov. 10, 2006, the entire contents of which are incorporated herein by reference.

BACKGROUND

1. Field

The disclosure relates to a control circuit for a synchronous rectifier-type DC-DC converter, a synchronous rectifier-type DC-DC converter and a control method thereof.

2. Description of Related Art

Portable electronic devices such as notebook computers generally employ DC-DC converters. In the portable electronic devices, power consumption of the DC-DC converters needs to be reduced to thus make the devices operational for a longer period of time.

Japanese Patent Publication No. H8(1996)-289535 discloses a DC-DC converter comprising an output value monitoring section that monitors an output voltage to determine whether a power supply is required with respect to a load, a current monitoring section that monitors a current flowing to a coil connected to an output terminal to determine whether a power supply is required with respect to a load, and a control section that places a switching section connected to the coil in an ON state or an OFF state, based on monitoring results of the output value monitoring section and monitoring results of the current monitoring section.

In the above-described DC-DC converter, if a power supply is required with respect to a load, the control section places the switching section in an ON state to supply power to the load, based on monitoring results of the output value monitoring section. At this time, the control section shifts to a mode in which an output is not received from the output value monitoring section.

When the switching section enters an ON state in the above-described DC-DC converter, the current flowing to the coil is increased. When the current monitoring section confirms that the coil current has reached a first current value, the control section places the switching section in an OFF state to thereby stop the supply of power to the load. When the switching section enters an OFF state, the current flowing to the coil is decreased. When the current flowing to the coil reaches a second current value, the control section returns to a mode in which an output is received from the output value monitoring section, to thereby monitor whether a power supply is required with respect to the load. The control section controls the switching section to an ON state or an OFF state, and as a result, the above-described DC-DC converter executes a series of power supply operations.

In the above-described DC-DC converter, the first and the second current values can be changed. Here, the first and the second current values are set accordingly in the above-described DC-DC converter, thereby allowing to set a cycle of power supply operations to a desired value and supply the required power to the load, while reducing the number of switchings. Accordingly, in the above-described DC-DC converter, by reducing the number of switchings, it is possible to suppress power losses, thereby reducing power consumption.

SUMMARY

It is an aspect of the embodiments discussed herein to provide a control circuit for a synchronous rectifier-type DC-DC converter including a first switching element that is made conductive when power is accumulated in an induction element and a second switching element that is made conductive when power accumulated in the induction element is supplied to a load, wherein the control circuit further includes a detecting unit detecting that a value of an output voltage of the synchronous rectifier-type DC-DC converter is a predetermined voltage value that is higher than a target voltage value and a control unit maintaining the second switching element in a conductive state after discharge of the power accumulated in the induction element is finished, based on detection results of the detecting unit.

The above and further objects and novel features of the disclosure will more fully appear from the following detailed description when the same is read in connection with the accompanying drawings. It is to be expressly understood, however, that the drawings are for the purpose of illustration only and are not intended as a definition of the limits of the disclosure.

DETAILED DESCRIPTION OF THE PREFERRED EMBODIMENTS

One Embodiment

Figure 1:
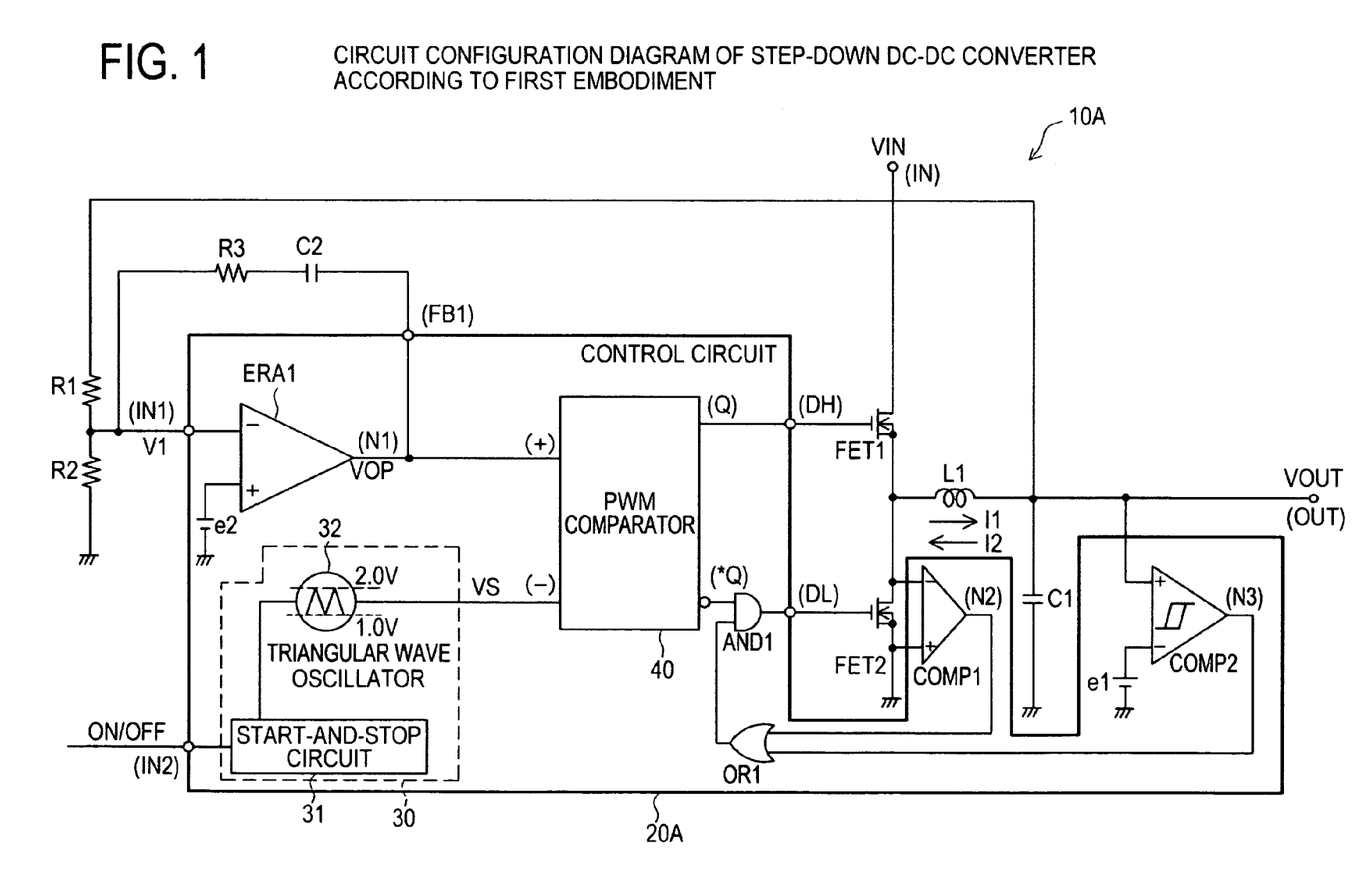
FIG. 1 is a circuit configuration diagram of a step-down DC-DC converter according to a first embodiment.
Figure 2:
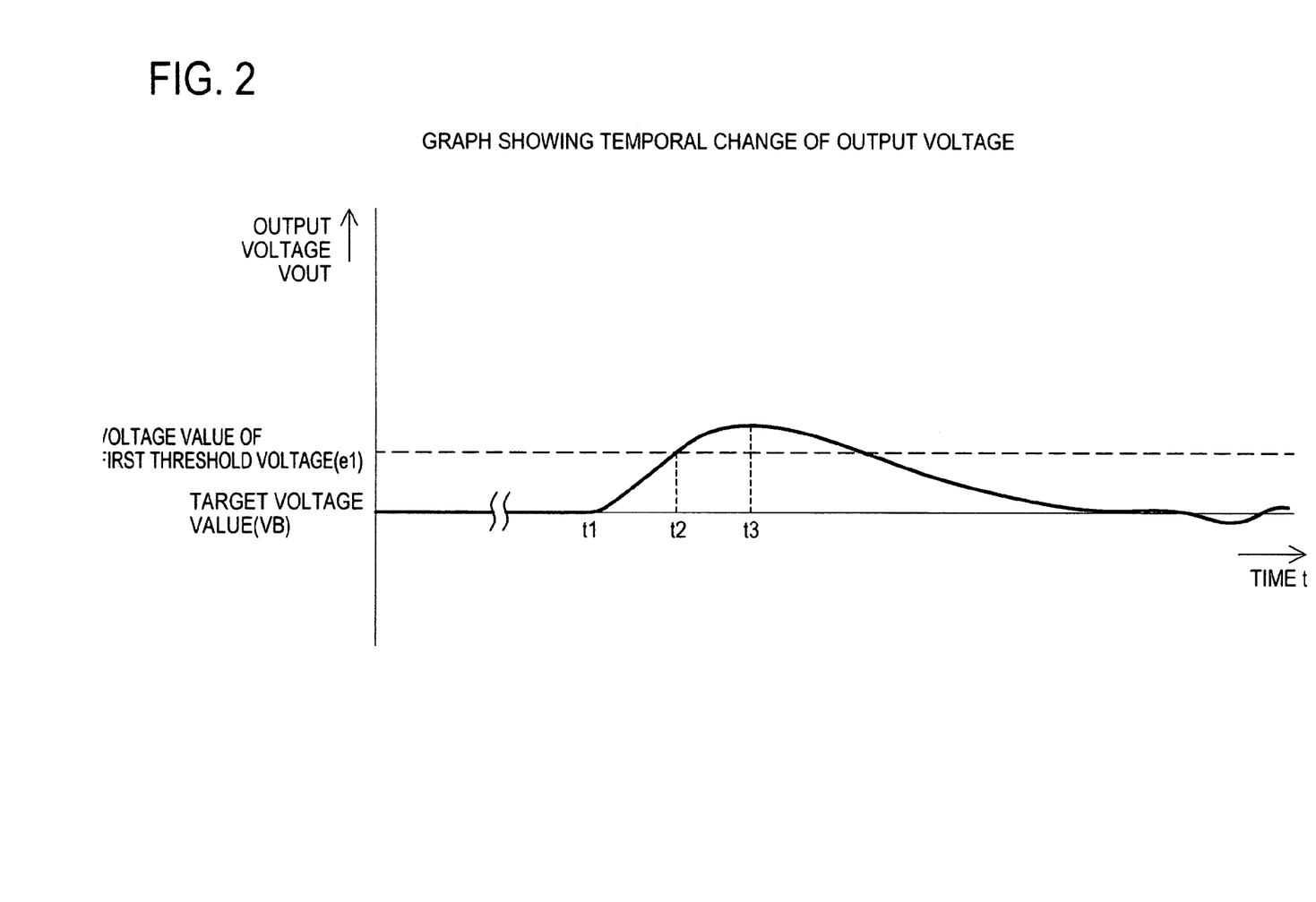
FIG. 2 is a graph showing a temporal change of the output voltage.

One embodiment of the present disclosure will be described in detail hereinafter with reference to FIG. 1 and FIG. 2. Here, the embodiment of the present disclosure is described by taking a step-down DC-DC converter 10A as an example. FIG. 1 is a circuit configuration diagram of a step-down DC-DC converter 10A. The step-down DC-DC converter 10A comprises a main switching transistor FET1, a synchronizing-side switching transistor FET2, a choke coil L1, a capacitor C1 and a control circuit 20A, as shown in the drawings. The control circuit 20A has a comparator COMP1 and a hysteresis comparator COMP2.

A drain of the main switching transistor FET1 is connected to an input terminal (IN). A direct current input voltage VIN is applied to the drain of the main switching transistor FET1 though the input terminal (IN). A source of the main switching transistor FET1 is connected to a drain of the synchronizing-side switching transistor FET2. The source of the synchronizing-side switching transistor FET2 is connected to a ground. The drain of the synchronizing-side switching transistor FET2 is connected to an inversion input terminal of the comparator COMP1. On the other hand, a source of the synchronizing-side switching transistor FET2 is connected to a non-inversion input terminal of the comparator COMP1.

One terminal of the choke coil L1 is connected to a connecting point between the source of the main switching transistor FET1 and the drain of the synchronizing-side switching transistor FET2. The other terminal of the choke coil L1 is connected to an output terminal (OUT). The capacitor C1 is connected between the output terminal (OUT) and the ground. Further, a non-inversion input terminal of the hysteresis comparator COMP2 is connected to the output terminal (OUT). A reference voltage e1 is applied to an inversion input terminal of the hysteresis comparator COMP2. The value of the reference voltage e1 is set to a target voltage value of the output voltage VOUT+ΔV.

A first threshold voltage and a second threshold voltage are set in the hysteresis comparator COMP2. Here, the voltage value of the first threshold voltage is set to a target voltage value +ΔV, and the voltage value of the second threshold voltage is set to a target voltage value of the output voltage VOUT. The first threshold voltage is used as a threshold with respect to a rising inclination of the output voltage VOUT, and the second threshold voltage is used as a threshold with respect to a falling inclination of the output voltage VOUT. The first threshold voltage corresponds to a first comparison voltage of the present disclosure, and the second threshold voltage corresponds to a second comparison voltage of the present disclosure.

The control circuit 20A corresponds to the control circuit of the present disclosure. The control circuit 20A comprises an error amplifier ERA1, an oscillation circuit 30, a PWM comparator 40, an AND gate circuit AND1 and an OR gate circuit OR1, in addition to the above-described comparator COMP1 and the hysteresis comparator COMP2.

The inversion input terminal of the error amplifier ERA1 is connected to a connecting point between resistor R1 and a resistor R2 through an input terminal (IN1) of the control circuit 20A. A voltage V1 obtained by voltage-dividing the output voltage VOUT by using the resistor R1 and the resistor R2 is applied to the inversion input terminal.

A reference voltage e2 is applied to the non-inversion input terminal of the error amplifier ERA1. When the value of the output voltage VOUT is the target voltage value, the value of the reference voltage e2 is set to the same value as the value of the voltage V1 that is applied to the inversion input terminal. The output terminal (N1) of the error amplifier ERA1 is connected to the terminal (FB1) of the control circuit 20A. A feedback capacitor C2 and a feedback resistor R3 are connected in series between the terminal (FB1) and the input terminal (IN1).

The oscillating circuit 30 has a start-and-stop circuit 31 and a triangular wave oscillator 32. An activation control signal ON/OFF is inputted to the start-and-stop circuit 31 through the input terminal (IN2) of the control circuit 20A. Here, the start-and-stop circuit 31 is constituted of an internal power source circuit that supplies power to the control circuit 20A in response to the activation control signal ON/OFF. The triangular wave oscillator 32 is constituted by using an OP amplifier, a resistor and a capacitor, and the like, for instance. The oscillation circuit 30 outputs a triangular wave signal VS. The triangular wave signal VS is amplified by a predetermined voltage value range (here, 1.0V~2.0V).

The PWM comparator 40 has a plus-side input terminal (+) and a minus-side input terminal (−). The plus-side input terminal (+) is connected to an output terminal (N1) of the error amplifier ERA1. The minus-side input terminal (−) is connected to the triangular wave oscillator 32.

The output terminal (Q) of the PWM comparator 40 is connected to a gate of the main switching transistor FET1 through the non-inversion input terminal (DH) of the control circuit 20A. The output terminal (*Q) of the PWM comparator 40 is connected to a first input of the AND gate circuit AND1. The output of the AND gate circuit AND1 is connected to the gate of the synchronizing-side switching transistor FET2 through the inversion output terminal (DL).

The output of the OR gate circuit OR1 is connected to a second input of the AND gate circuit AND1. The first input of the OR gate circuit OR1 is connected to the output terminal (N2) of the comparator COMP1, and the second input of the OR gate circuit OR1 is connected to the output terminal (N3) of the hysteresis comparator COMP2.

Next, a control method of the step-down DC-DC converter 10A will be described. The step-down DC-DC converter 10A supplies the output voltage VOUT to a load circuit connected to the output terminal (OUT) by controlling the ON/OFF of the main switching transistor FET1 and the synchronizing-side switching transistor FET2 in an alternating fashion. In the step-down DC-DC converter 10A of the present embodiment, the output voltage VOUT can be controlled to a target voltage value with respect to the direct current input voltage VIN, by changing the ratio (duty ratio) of the ON time TON of the PWM signal with respect to one period.

The relationship between the direct current input voltage VIN and the output voltage VOUT is shown by the following expression.

$$VOUT = \{TON/(TON+TOFF)\} \times VIN$$

Here, TON/(TON+TOFF) shows the duty ratio.

The error comparator ERA1 compares the voltage V1 with the reference voltage e2, and outputs an error amplifier output voltage VOP to the PWM comparator 40. The error amplifier output voltage VOP is obtained by subjecting the voltage V1 to error amplification with respect to the reference voltage e2. The triangular wave oscillator 32 outputs the triangular wave signal VS to the PWM comparator 40.

The error amplifier output voltage VOP is inputted to the plus-side input terminal (+) of the PWM comparator 40, and the triangular wave signal VS is inputted to the minus-side input terminal (−) of the PWM comparator 40. The PWM comparator 40 compares the error amplifier output voltage VOP with the voltage value of the triangular wave signal VS.

If the error amplifier output voltage VOP is higher than the voltage value of the triangular wave signal VS, the PWM comparator 40 outputs a high level PWM signal from the output terminal (Q). At this time, the PWM comparator 40 outputs a low level inversion PWM signal from the output terminal (*Q).

Contrary to this, if the error amplifier output voltage VOP is lower than the voltage value of the triangular wave signal VS, the PWM comparator 40 outputs a low level PWM signal from the output terminal (Q). At this time, the PWM comparator 40 outputs a high level inversion PWM signal from the output terminal (*Q)

If the voltage V1 is lower as compared to the reference voltage e2, the error amplifier output voltage VOP is boosted, and the time (TON) required by the PWM signal to come to a high level becomes longer. As a result, the duty ratio becomes large, and the output voltage VOUT is boosted. Contrary to this, if the voltage V1 is higher compared to the reference voltage e2, the error amplifier output voltage VOP drops, and the time (TOFF) required by the PWM to come to a low level becomes longer. As a result, the duty ratio becomes small, and the output voltage VOUT drops.

The PWM signal is inputted to the gate of the main switching transistor FET1 through the non-inversion output terminal (DH) If the PWM signal is at a high level, the main switching transistor FET1 enters an ON state and a current I1 flows. As a result, power is accumulated in the choke coil L1. The main switching transistor FET1 enters an ON state when power is accumulated in the choke coil L1, and therefore corresponds to the first switching element of the present disclosure.

When the main switching transistor FET1 enters an ON state, the voltage value on the input terminal (IN) side of the choke coil L1 is boosted up to a voltage value of the direct current input voltage VIN. The drain voltage of the synchronizing-side switching transistor FET2 is boosted more than the ground voltage. As a result, the comparator COMP1 outputs a low level signal to the first input of the OR gate circuit OR1. If the value of the output voltage VOUT does not exceed the value of the first threshold voltage, the hysteresis comparator COMP2 outputs a low level signal to the second input of the OR gate circuit OR1.

The OR gate circuit OR1 outputs a low level signal to the second input of the AND gate circuit AND1. At this time, when the low level inversion PWM signal is inputted by the PWM comparator 40 to the first input of the AND gate circuit AND1, the AND gate circuit AND1 outputs a low level signal to the gate of the synchronizing-side switching transistor FET2 through the inversion output terminal (DL) As a result, the synchronizing-side switching transistor FET2 enters an OFF state.

If the PWM signal is inverted from a high level to a low level, the main switching transistor FET1 enters an OFF state. A body diode of the synchronizing-side switching transistor FET2 enters an ON state and a current flows from the ground towards the choke coil L1. As a result, the output signal of the comparator COMP1 is inverted to a high level, and the OR gate circuit OR1 outputs a high level signal to the second input of the AND gate circuit AND1. At this time, a high level signal is inputted by the PWM comparator 40 to the first input of the AND gate circuit AND1. The AND gate circuit AND1 outputs a high level signal to the gate of the synchronizing-side switching transistor FET2. As result, the synchronizing-side switching transistor FET2 enters an ON state.

When the synchronizing-side switching transistor FET2 enters an ON state, a current path is formed from the ground towards the choke coil L1, through the transistor FET2. As a result, the power accumulated in the choke coil L1 is supplied to the load circuit through the output terminal (OUT). The synchronizing-side switching transistor FET2 enters an ON state when the power accumulated in the choke coil L1 is supplied to the load circuit, and therefore corresponds to a second switching element of the present disclosure.

The following operations are carried out in the step-down DC-DC converter 10A of the present embodiment when the state in which power is supplied to the load circuit changes into a light load state or a no-load state. When the state changes to a light load state or a no-load state at time t1 as shown in FIG. 2, the excess power supply is accumulated in the capacitor C1, thereby causing a boost in the output voltage VOUT. Then, when the value of the output voltage VOUT exceeds the voltage value of the first threshold voltage e1 of the hysteresis comparator COMP2 at time t2, the hysteresis comparator COMP2 outputs a high level signal to the second input of the OR gate circuit OR1.

When the comparator COMP1 detects that the value of the drain voltage of the synchronizing-side switching transistor FET2 is higher than the value of the ground voltage, it outputs a low level signal to the first input of the OR gate circuit OR1 and detects that the current I2 flows. Thus, even in the case that a low level signal is inputted to the first input of the OR gate circuit OR1, the OR gate circuit OR1 outputs a high level signal to the second input of the AND gate circuit AND1 if a high level signal is inputted to the second input of the OR gate circuit OR1.

As described in the above text, when the value of the output voltage VOUT is boosted, the value of voltage V1 exceeds the value of the reference voltage e2 at time t2. As a result, the error amplifier output voltage VOP drops, thereby causing the time (TOFF) required by the PWM signal to come to a low level to become longer and causing the time required by the inversion PWM signal to come to a high level to become longer.

When the PWM comparator 40 outputs a high level inversion PWM signal to the first input of the AND gate circuit AND1, the AND gate circuit AND1 outputs a high level signal to the synchronizing-side switching transistor FET2. As a result, the synchronizing-side switching transistor FET2 enters an ON state. In this case, a current I1 flows, and power accumulated in the choke coil L1 is supplied to the load circuit through the output terminal (OUT). When the synchronizing-side switching transistor FET2 is maintained in an ON state, current I2 flows from the output terminal (OUT) mainly towards the choke coil L1, after power was discharged from the choke coil L1.

In the present embodiment, current I2 begins to flow at time t3. As a result, the value of the output voltage VOUT drops towards the target voltage value VB, as shown in FIG. 2. Then, if the value of the output voltage VOUT falls below the target voltage value VB, the hysteresis comparator COMP2 outputs a low level signal to the second input of the OR gate circuit OR1. Here, a low level signal is inputted by the comparator COMP1 to the first input of the OR gate circuit OR.

Next, the OR gate circuit OR1 outputs the low level signal to the second input of the AND gate circuit AND1. Here, the AND gate circuit AND1 outputs the low level signal to the gate of the synchronizing-side switching transistor FET2. As a result, the synchronizing-side switching transistor FET2 enters an OFF state.

Then, as described in the above text, the PWM comparator 40 controls the main switching transistor FET1 and the synchronizing-side switching transistor FET2 to ON or OFF in an alternative fashion in response to the error amplifier output voltage VOP. As a result, the value of the output voltage VOUT is controlled so as to become the target voltage value VB.

In the present embodiment, the hysteresis comparator COMP2 compares the value of the output voltage VOUT with the voltage value of the first threshold voltage e1 to detect whether the value of the output voltage VOUT becomes the target voltage value +ΔV. Accordingly, the hysteresis comparator COMP2 corresponds to the detecting unit of the present disclosure. Also, comparing of the value of the output voltage VOUT with the voltage value of the first threshold voltage e1, to detect whether the value of the output voltage VOUT becomes the target voltage value +ΔV corresponds to the step of detecting of the present disclosure.

In the present embodiment, the comparator COMP1 detects that the current I2 (back-flow current) flows when it makes a detection that the value of the drain voltage in the synchronizing-side switching transistor FET2 is higher than the value of the ground voltage. Accordingly, the comparator COMP1 corresponds to the back-flow current detecting unit of the present disclosure. Detecting that current I2 (back-flow current) flows by detecting that the value of the drain voltage of the synchronizing-side switching transistor FET2 is higher than the value of the ground voltage corresponds to the step of back-flow current detecting of the present disclosure.

In the present embodiment, the output signal of the comparator COMP1 and the output signal of the hysteresis comparator COMP2 are inputted to the OR gate circuit OR1. Further, in the present embodiment, when a high level signal is inputted by the OR gate circuit OR1 to the second input of the AND gate circuit AND1, and a high level signal is inputted by the PWM comparator 40 to the first input of the AND gate circuit AND1, the AND gate circuit AND1 outputs a high level signal to the gate of the synchronizing-side switching transistor FET2. Accordingly, the OR gate circuit OR1 and the AND gate circuit AND1 outputs a high level signal to place the transistor FET2 in an ON state, and therefore corresponds to the signal output unit of the present disclosure. Also, outputting high level signals from the OR gate circuit OR1 and the AND gate circuit AND1 to place the transistor FET2 in an ON state corresponds to the step of signal outputting of the present disclosure.

As described in the above text, the OR gate circuit OR1 and the AND gate circuit AND1 maintain the synchronizing-side switching transistor FET2 in an ON state even after the power accumulated in the choke coil L1 and the power accumulated in the capacitor C1 was discharged. Accordingly, the OR gate circuit OR1 and the AND gate circuit AND1 correspond to the control unit of the present disclosure. Maintaining of the synchronizing-side switching transistor FET2 in an ON state even after the power accumulated in the choke coil L1 and the power accumulated in the capacitor C1 was discharged corresponds to the step of controlling of the present disclosure.

(Effects of this Embodiment)

According to the step-down DC-DC converter 10A and the control circuit 20A thereof according to the present embodiment, if the synchronizing-side switching transistor FET2 is maintained in an ON state, the power accumulated in the choke coil L1 and the power accumulated in the capacitor C1 is supplied to the load circuit through the output terminal (OUT), so that a detection is made that the value of the output voltage VOUT has reached a voltage vale (target voltage value +ΔV) of the first threshold voltage e1 at time t2. Then, in the step-down DC-DC converter 10A and the control circuit 20A thereof of the present disclosure, after the synchronizing-side switching transistor FET2 is maintained in an ON state and after the power is discharged from the choke coil L1, current I2 can flow from the output terminal (OUT) mainly towards the choke coil L1. Here, according to the step-down DC-DC converter 10A and the control circuit 20A thereof of the present embodiment, the value of the output voltage VOUT can be dropped after time t3 to thereby prevent an overshoot state from continuing.

According to the control method of the step-down DC-DC converter 10A of the present embodiment, if the synchronizing-side switching transistor FET2 is maintained in an ON state, the power accumulated in the choke coil L1 and the power accumulated in the capacitor C1 is supplied to the load circuit through the output terminal (OUT), and a detection is made that the value of the output voltage VOUT reaches a voltage value (target voltage value +ΔV) of the first threshold voltage e1 at time t2. Then, according to the control method of the step-down DC-DC converter 10 of the present embodiment, the synchronizing side switching transistor FET2 is maintained in an ON state, and after the power is discharged from the choke coil L1, a current I2 can flow from the output terminal (OUT) mainly towards the choke coil L1. Here, according to the control method of the step-down DC-DC converter 10A of the present embodiment, the value of the output voltage VOUT can drop after time t3, which makes it possible to prevent an overshoot state from continuing.

In the step-down DC-DC converter 10A and a control circuit 20A thereof according to the present embodiment, the voltage value of the first threshold voltage e1 in the hysteresis comparator COMP2 is set to the target voltage value +ΔV, and the voltage value of the second threshold voltage in the comparator COMP2 is set to the target voltage value VB. As a result, if the output voltage VOUT of the step-down DC-DC converter 10A is boosted, the hysteresis comparator COMP2 outputs a low level signal when the value of the output voltage VOUT is lower than the voltage value of the first threshold voltage e1, and the comparator COMP2 outputs a high level signal when the value of the output voltage VOUT is higher than the voltage value of the first threshold voltage e1. According to the step-down DC-DC converter 10A and the control circuit 20A thereof of the present embodiment, the hysteresis comparator COMP2 can compare the value of the output voltage VOUT with the voltage value of the first threshold voltage e1, thereby making it possible to detect whether the value of the output voltage VOUT exceeds the target voltage value and an overshoot state is entered. Also, if the output voltage VOUT of the step-down DC-DC converter 10A drops, the hysteresis comparator COMP2 outputs a low level signal when the output voltage VOUT of the step-down DC-DC converter 10A drops. Here, the step-down DC-DC converter 10A and the control circuit 20A thereof of the present embodiment can help prevent chattering of the output signal of the hysteresis comparator COMP2 when the value of the voltage value of the output voltage VOUT is between the voltage value of the first threshold voltage e1 and the voltage value (target voltage value VB) of the second threshold voltage, even when noise is superimposed on the output voltage VOUT. Accordingly, according to the step-down DC-DC converter 10A and the control circuit 20A thereof of the present embodiment, it is possible to suppress fluctuations of the output signal of the hysteresis comparator COMP2, thereby making it possible to stabilize voltage comparison results of the hysteresis comparator COMP2.

In addition, according to the step-down DC-DC converter 10A and the control circuit 20A thereof of the present embodiment, the AND gate circuit AND1 of the control circuit 20A outputs the low level signal to the gate of the synchronizing-side switching transistor FET2, at the point in time the voltage value of the second threshold voltage is set to the target voltage value VB, and a detection is made by the hysteresis comparator COMP2 that the value of the output voltage VOUT has fallen below the target voltage value VB. As a result, a situation that the synchronizing-side switching transistor FET2 is maintained in an ON state can be avoided. Here, the function of the synchronizing-side switching transistor FET2 can be restored to the function of the switching transistor according to which the current I2 (back-flow current) is prevented from flowing. Also, it is possible to prevent the state in which the value of the output voltage VOUT falls below the target voltage value VB from being maintained by canceling the ON state of the synchronizing-side switching transistor FET2.

In the control method of the step-down DC-DC converter 10A of the present embodiment, the output voltage VOUT is compared with the first threshold voltage e1 whose voltage value is set to the target voltage value +ΔV. Further, in the control method of the step-down DC-DC converter 10A of the present embodiment, the output voltage VOUT is compared with the second threshold voltage whose voltage value is set to the target voltage value VB. As a result, if the output voltage VOUT of the step-down DC-DC converter 10A is boosted, a low level signal is outputted as comparison result when the value of the output voltage VOUT is lower than the voltage value of the first threshold voltage e1, and a high level signal is outputted as comparison result when the value of the output voltage VOUT is higher than the voltage value of the first threshold voltage e1. According to the control method of the step-down DC-DC converter 10A of the present embodiment, a detection can be made as to whether the value of the output voltage VOUT exceeds the target voltage value and the output voltage VOUT is in an overshoot state, by comparing the output voltage VOUT with the first threshold voltage e1. Also, according to the control method of the step-down DC-DC converter 10A of the present embodiment, if the output voltage VOUT of the step-down DC-DC converter 10A drops, a low level signal is outputted as a comparison result when the value of the output voltage VOUT is lower than the voltage value of the second threshold voltage. Here, the control method of the step-down DC-DC converter 10A of the present embodiment helps prevent chattering of the output signal serving as the comparison result when the value of the output voltage VOUT is between the voltage value of the first threshold voltage e1 and the voltage value (target voltage value VB) of the second threshold voltage, even in the case that noise is superimposed on the output voltage VOUT. Accordingly, according to the control method of the step-down DC-DC converter 10A of the present embodiment, it is possible to suppress fluctuations of the output signal, thereby making it possible to stabilize the comparison results.

In addition, according to the control method of the step-down DC-DC converter 10A of the present embodiment, a low level signal is outputted to the gate of the synchronizing-side switching transistor FET2, at a point in time that the voltage value of the second threshold voltage is set to the target voltage value VB and a detection is made that the value of the output voltage VOUT has fallen below the target voltage value VB. As a result, it is possible to prevent a situation that the synchronizing-side switching transistor FET2 is maintained in an ON state. Here, the function of the synchronizing-side switching transistor FET2 can be restored to the function of the switching transistor according to which the current I2 (back-flow current) is prevented from flowing. Also, it is possible to prevent maintaining of a state that the value of the output voltage VOUT falls below the target voltage value VB by canceling the ON state of the synchronizing-side switching transistor FET2.

According to the step-down DC-DC converter 10A and the control circuit 20A thereof of the present embodiment, if a detection is made by the hysteresis comparator COMP2 that the value of the output voltage VOUT has reached the voltage value (target voltage value +ΔV) of the first threshold voltage e1, in addition to the detection made by the comparator COMP1 that the current I2 (back-flow current) is flowing, the OR gate circuit OR1 and the AND gate circuit AND1 can output a high level signal to the gate of the transistor FET2 to place the synchronizing-side switching transistor FET2 in an ON state, to thus cause the value of the output voltage VOUT to drop.

According to the control method of the step-down DC-DC converter 10A of the present embodiment, if a detection is made that the value of the output voltage VOUT has reached the voltage value (target voltage value +ΔV) of the first threshold voltage e1, in addition to the detection that the current I2 (back-flow current) is flowing, a high level signal to place the synchronizing-side switching transistor FET2 in an ON state can be outputted to the gate of the transistor FET2 to thus cause the value of the output voltage VOUT to drop.

Another Embodiment

Figure 3:
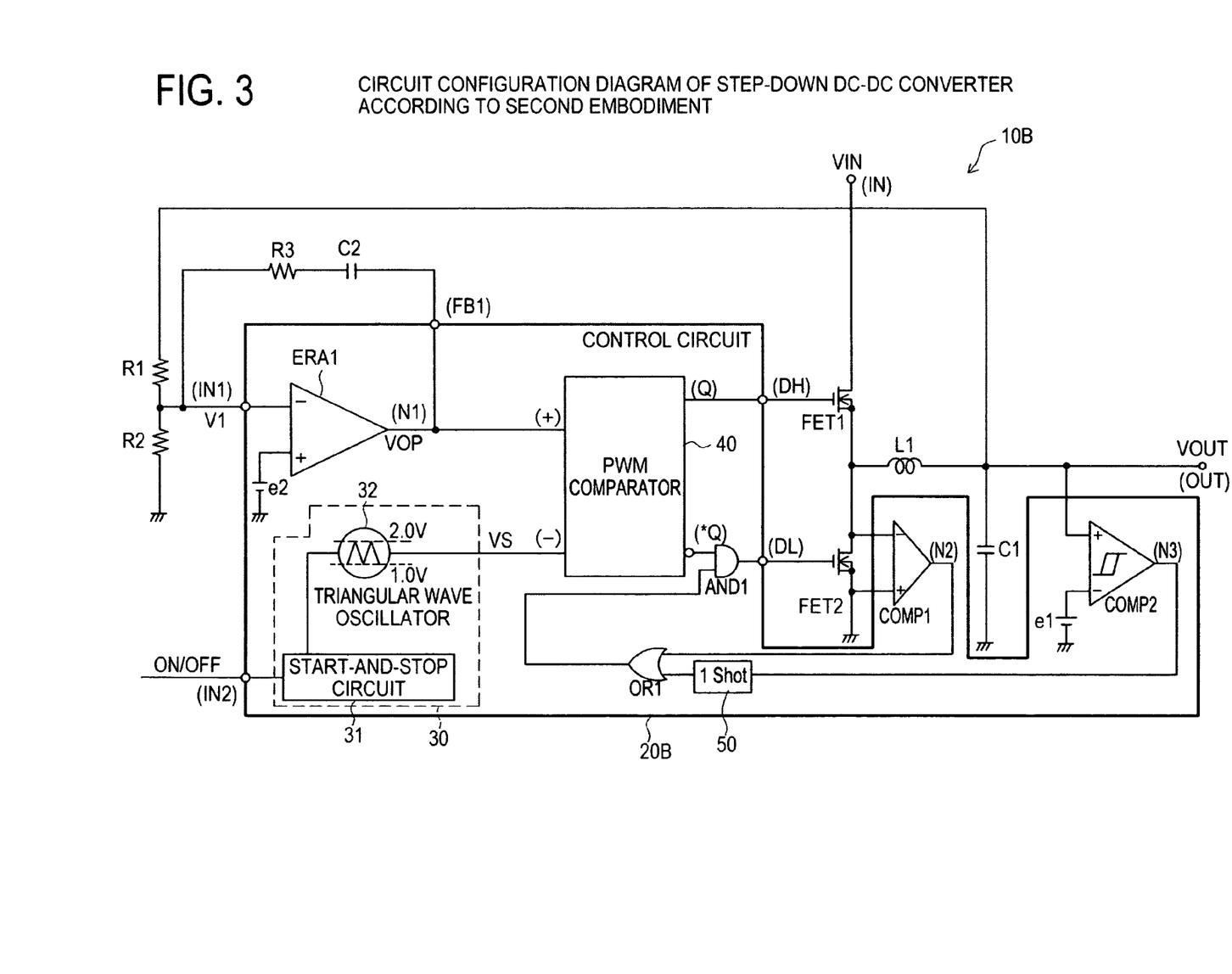
FIG. 3 is a circuit configuration diagram of a step-down DC-DC converter according to a second embodiment.
Figure 4:
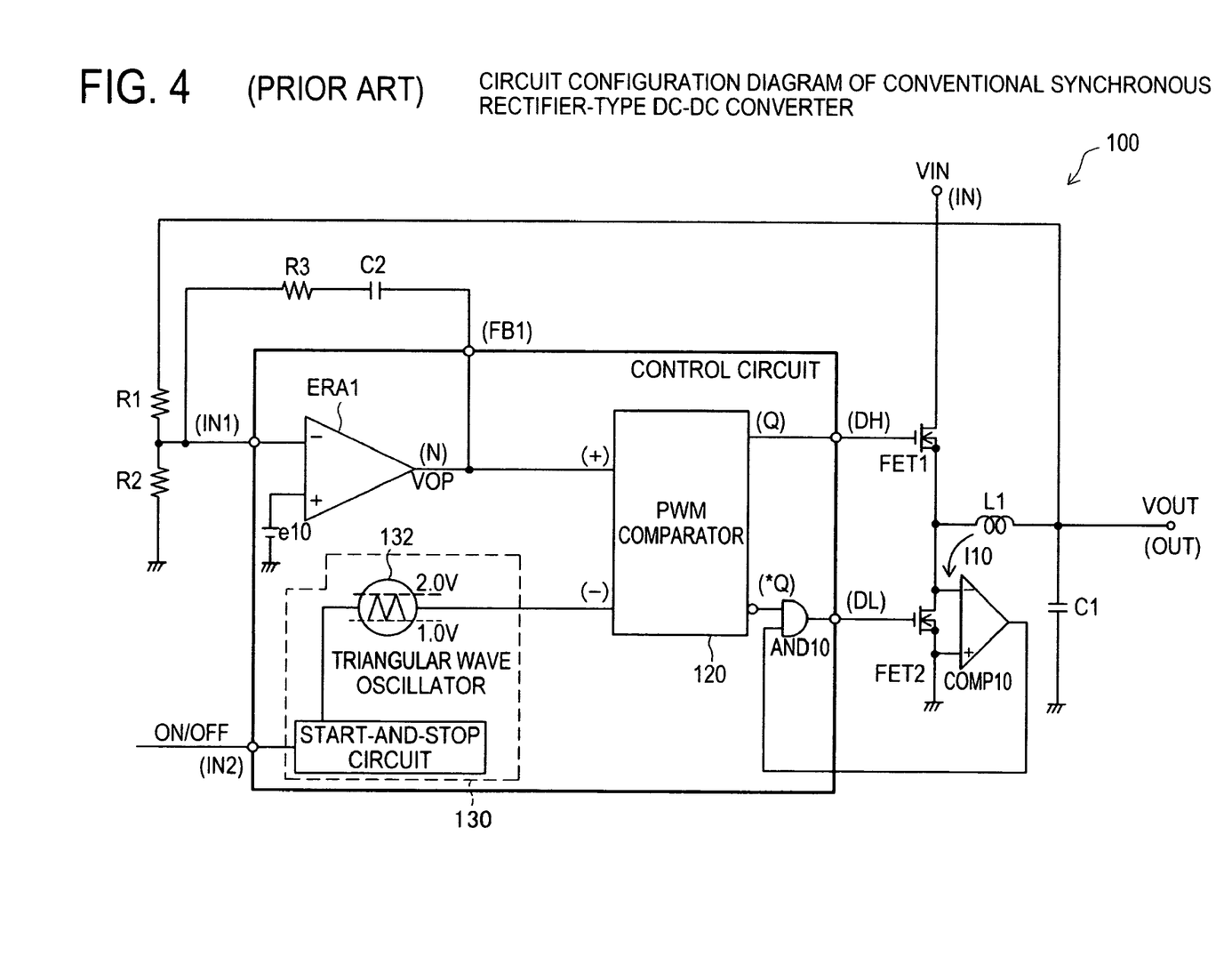
FIG. 4 is a circuit configuration diagram of a conventional synchronous rectifier-type DC-DC converter.

A second embodiment of the present disclosure will now be described with reference to FIG. 3. Here, elements which are the same as those of above-mentioned embodiment are designated by the same numeric symbols, and further description thereof is hereby omitted. FIG. 3 is a circuit configuration diagram of the step-down DC-DC converter 10B of the present embodiment. The step-down DC-DC converter 10B has a control circuit 20B that comprises a one-shot generator 50, in place of the control circuit 20A of the step-down DC-DC converter 10A of the above-mentioned embodiment. The one-shot generator 50 is connected between the output terminal (N3) of the hysteresis comparator COMP2 and the second input of the OR gate circuit OR.

In the step-down DC-DC converter 10B of the present embodiment, the following operations are carried out when the state in which power is supplied to the load circuit changes to a light load state or a no-load state. As was described in the above text, when the value of the output voltage VOUT exceeds the voltage value of the first threshold voltage e1 of the hysteresis comparator COMP2, the hysteresis comparator COMP2 outputs a high level signal to the one-shot generator 50.

When a rising edge of the high level signal is detected, the one-shot generator 50 outputs a high level signal having a predetermined pulse duration to the second input of the OR gate circuit OR1. The OR gate circuit OR1 outputs a high level signal to the second input of the AND gate circuit AND1 over a time period corresponding to the pulse duration. When the high level signal is inputted to the first input of the AND gate circuit AND1, and a high level signal is also inputted to the second input of the AND gate circuit AND1 over the time period corresponding to the pulse duration, the AND gate circuit AND1 outputs a high level signal to the gate of the synchronizing-side switching transistor FET2. As a result, the synchronizing-side switching transistor FET2 is an ON state over the time period corresponding to the pulse duration.

When the one-shot generator 50 finishes outputting the high level signal, the OR gate circuit OR1 outputs a low level signal to the second input of the AND gate circuit AND1 even in the case that the value of the output voltage VOUT exceeds the voltage value of the first threshold voltage e1. Even if the value of the output voltage VOUT exceeds the voltage value of the first threshold voltage e1 and the current I2 (back-flow current) is flowing, as described in the above text, if a low level signal is inputted to the second input of the AND gate circuit AND1, the AND gate circuit AND1 outputs a low level signal to the gate of the synchronizing-side switching transistor FET2. As a result, the synchronizing-side switching transistor FET2 enters an OFF state.

In the present embodiment, if a rising edge of the high level signal outputted by the hysteresis comparator COMP2 is detected by the one-shot generator 50, the one-shot generator 50 outputs a high level signal to the second input of the OR gate circuit OR1 over the period of time corresponding to the predetermined pulse duration. Accordingly, the one-shot generator corresponds to the clock outputting unit of the present disclosure.

In the present embodiment, if a rising edge of the high level signal outputted from the hysteresis comparator COMP2 is detected, an operation is carried out to output a high level signal to the second input of the OR gate circuit OR1 over the time period corresponding to the determined pulse duration. This operation corresponds to the step of clock outputting of the present disclosure.

In the step-down DC-DC converter 10B and the control circuit 20B thereof of the present embodiment, if the value of the output voltage VOUT exceeds a voltage value of the first threshold voltage e1 and the current I2 (back-flow current) is flowing, a high level signal that is similar to the detection results of the hysteresis comparator COMP2 can be outputted by the one-shot generator 50 to the second input of the OR gate circuit OR1, over the time period corresponding to the predetermined pulse duration. Here, according to the step-down DC-DC converter 10B and the control circuit 20B thereof of the present embodiment, the OR gate circuit OR1 can output a high level signal to control the synchronizing-side switching transistor FET2 to an ON state over the time period corresponding to the pulse duration by using the one-shot generator 50, in response to the high level signal outputted from the hysteresis comparator COMP2. Accordingly, in the step-down DC-DC converter 10B and the control circuit 20B thereof of the present embodiment, the time period in which the synchronizing-side switching transistor FET2 is controlled to an ON state can be controlled to the time corresponding to the pulse duration, which allows to reduce power loss occurring at the time the transistor FET2 is in an ON state.

According to the control method of the step-down DC-DC converter 10B of the present embodiment, if the value of the output voltage VOUT exceeds the voltage value of the first threshold voltage e1 and the current I2 (back-flow current) is flowing, a high level signal similar to the detection results of the hysteresis comparator COMP2 can be outputted to the second input of the OR gate circuit OR1 over the time period corresponding to the predetermined pulse duration. Here, according to the control method of the step-down DC-DC converter 10B of the present embodiment, a high level signal can be outputted to control the synchronizing-side switching transistor FET2 to an ON state over the time period corresponding to the pulse duration, in response to the high level signal outputted by the hysteresis comparator COMP2. Accordingly, according to the control method of the step-down DC-DC converter 10B of the present embodiment, the time period in which the synchronizing-side switching transistor FET2 is controlled to an ON state can be controlled to the time period corresponding to the pulse duration, thereby allowing to reduce the power loss occurring when the transistor FET2 is in an ON state.

The present disclosure is not limited to the above-described embodiment, and needless to say, various improvements and modifications thereof can be performed without departing from the scope of the embodiment. In the above-described step-down converter 10A, the voltage value of the first threshold voltage e1 in the hysteresis comparator COMP2 may be changed by changing the voltage value (ΔV) that is added to the target voltage value, accordingly. In the above-described step-down DC-DC converter 10B, the pulse duration of the high level signal outputted from the one-shot generator 50 may be changed accordingly taking into consideration the amount of power loss generated by the synchronizing-side switching transistor FET2. Further, in the above-described step-down DC-DC converters 10A and 10B, the voltage value of the second threshold voltage may be set to a value between the target voltage value VB and the voltage value of the first threshold voltage e1, in place of the target voltage value VB.

The above-described control circuit 20A of the step-down DC-DC converter 10A and the control circuit 20B of the step-down DC-DC converter 10B may be constituted by a single semiconductor chip or a plurality of semiconductor chips. Also, the step-down DC-DC converters 10A and 10B may be constituted by a single semiconductor chip or a plurality of semiconductor chips. Further, the electric device may also employ a step-down DC-DC converter 10 comprising a control circuit 20A or a step-down DC-DC converter 10B comprising a control circuit 20B.

According to the control circuit for the synchronous rectifier-type DC-DC converter, the synchronous rectifier-type DC-DC converter and the control method thereof according to the present disclosure, after a detection is made that the value of the output voltage of the synchronous rectifier-type DC-DC converter is a predetermined voltage value that is higher than the target voltage value, and discharge of the power accumulated in the induction element is finished, a current can flow from the load to the induction element when the second switching element is maintained in a conductive state, thereby making it possible to drop the value of the output voltage.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A control circuit for a synchronous rectifier-type DC-DC converter comprising:
    a first switching element that is made conductive when power is accumulated in an induction element; and
    a second switching element that is made conductive when power accumulated in the induction element is supplied to a load,
    wherein the control circuit further comprises:
    a detecting unit detecting that a value of an output voltage of the synchronous rectifier-type DC-DC converter is a predetermined voltage value that is higher than a target voltage value; and
    a control unit maintaining the second switching element in a conductive state after discharge of the power accumulated in the induction element is finished, based on detection results of the detecting unit.

2. The control circuit for the synchronous rectifier-type DC-DC converter according to claim 1, wherein the detecting unit comprises a hysteresis comparator having a first comparison voltage that is set to a predetermined voltage value that is higher than the target voltage value.

3. The control circuit for the synchronous rectifier-type DC-DC converter according to claim 2, wherein the hysteresis comparator has a second comparison voltage whose voltage value is set to the target voltage value.

4. The control circuit for the synchronous rectifier-type DC-DC converter according to claim 2, wherein the control unit comprises:
    a back-flow detecting unit detecting a direction of a current flowing to the second switching element; and
    a signal outputting unit outputting a control signal to control the second switching element to a conductive state, based on a detection result of the back-flow current detecting unit and a detection result of the detecting unit.

5. The control circuit for the synchronous rectifier-type DC-DC converter according to claim 4, further comprising a clock outputting unit outputting the detection results of the detecting unit to the signal outputting unit over a predetermined time period, with a detecting operation of the detecting unit as a starting point.

6. The control circuit for the synchronous rectifier-type DC-DC converter according to claim 1, wherein the control unit comprises:
a back-flow current detecting unit detecting a direction of a current flowing to the second switching element; and
a signal outputting unit outputting a control signal to control the second switching element to a conductive state, based on a detection result of the back-flow current detecting unit and a detection result of the detecting unit.

7. The control circuit for the synchronous rectifier-type DC-DC converter according to claim 6, further comprising a clock outputting unit outputting the detection results of the detecting unit to the signal outputting unit over a predetermined time period, with a detecting operation of the detecting unit as a starting point.

8. A synchronous rectifier-type DC-DC converter comprising:
a first switching element that is made conductive when power is accumulated in an induction element and a capacitance element; and
a second switching element that is made conductive when power accumulated in the induction element and the capacitance element is supplied to a load,
wherein the synchronous rectifier-type DC-DC converter further comprises:
a first resistor element and a second resistor element dividing an output voltage to generate an input voltage for the synchronous rectifier-type DC-DC;
a detecting unit detecting that a value of the output voltage of the synchronous rectifier-type DC-DC converter is a predetermined voltage value that is higher than a target voltage value; and
a control unit maintaining the second switching element in a conductive state after discharge of power accumulated in the induction element and the capacitance element is finished, based on detection results of the detecting unit.

9. The synchronous rectifier-type DC-DC converter according to claim 8, wherein the detecting unit comprises a hysteresis comparator having a first comparison voltage set to a predetermined voltage value that is higher than the target voltage value.

10. The synchronous rectifier-type DC-DC converter according to claim 9, wherein the hysteresis comparator has a second comparison voltage whose voltage value is set to the target voltage value.

11. The synchronous rectifier-type DC-DC converter according to claim 9, wherein the control unit comprises:
a back-flow current detecting unit detecting a direction of a current flowing to the second switching element; and
a signal outputting unit outputting a control signal to control the second switching element to a conductive state, based on a detection result of the back-flow current detecting unit and a detection result of the detecting unit.

12. The synchronous rectifier-type DC-DC converter according to claim 11, further comprising a clock outputting unit outputting the detection results of the detecting unit to the signal outputting unit over a predetermined time period, with a detecting operation of the detecting unit as a starting point.

13. The synchronous rectifier-type DC-DC converter according to claim 8, wherein the control unit comprises:
a back-flow current detecting unit detecting a direction of a current flowing to the second switching element; and
a signal outputting unit outputting a control signal to control the second switching element to a conductive state, based on a detection result of the back-flow current detecting unit and a detection result of the detecting unit.

14. The synchronous rectifier-type DC-DC converter according to claim 13, further comprising a clock outputting unit outputting the detection results of the detecting unit to the signal outputting unit over a predetermined time period, with a detecting operation of the detecting unit as a starting point.

15. A control method for a synchronous rectifier-type DC-DC converter in which a first switching element is made conductive when power is accumulated in an induction element, and a second switching element is made conductive when power accumulated in the induction element is supplied to a load, wherein the control method comprises:
detecting that a value of an output voltage of the synchronous rectifier-type DC-DC converter is a predetermined voltage value that is higher than a target voltage value; and
controlling to maintain the second switching element in a conductive state after discharge of power accumulated in the induction element is finished, based on a detection result in the detecting.

16. The control method of the synchronous rectifier-type DC-DC converter according to claim 15, wherein the detecting, the output voltage is compared with a first comparison voltage that is set to a predetermined voltage value that is higher than the target voltage value.

17. The control method of the synchronous rectifier-type DC-DC converter according to claim 16, wherein in the detecting, the output voltage is compared with a second comparison voltage whose voltage value is set to the target voltage value.

18. The control method of the synchronous rectifier-type DC-DC converter according to claim 16, wherein the controlling comprises:
back-flow current detecting to detect a direction of a current flowing to the second switching element; and
signal outputting to output a control signal to control the second switching element to a conductive state, based on a detection result of the back-flow current detecting and a detection result of the detecting.

19. The control method of the synchronous rectifier-type DC-DC converter according to claim 18, further comprising the clock outputting to output the detection results over a predetermined time period, with a detecting operation of the detecting as a starting point.

20. The control method of the synchronous rectifier-type DC-DC converter according to claim 15, wherein the controlling comprises:
back-flow current detecting to detect a direction of a current flowing to the second switching element; and
signal outputting to output a control signal to control the second switching element to a conductive state, based on a detection result of the back-flow current detecting and a detection result of the detecting.

21. The control method of the synchronous rectifier-type DC-DC converter according to claim 20, further comprising the clock outputting to output the detection results over a predetermined time period, with a detecting operation of the detecting as a starting point.

* * * * *